United States Patent Office 3,252,341
Patented May 24, 1966

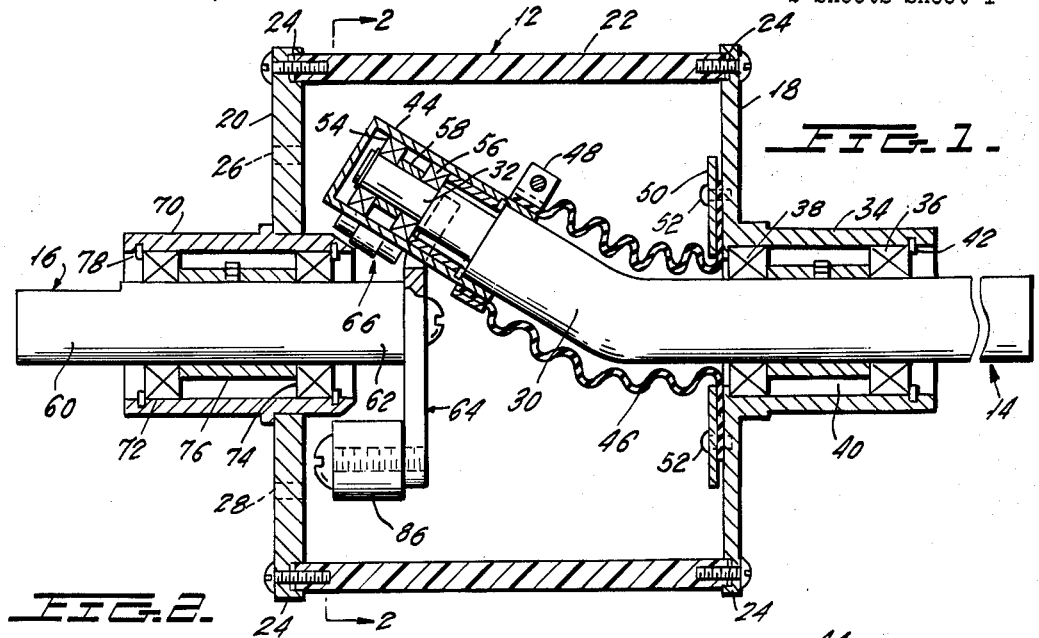
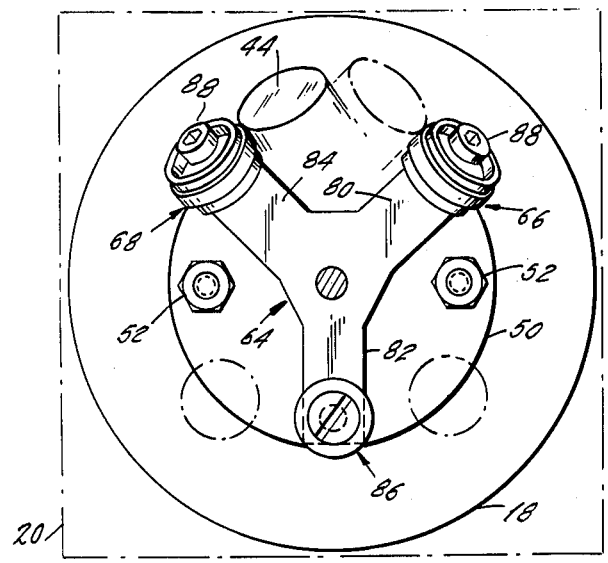

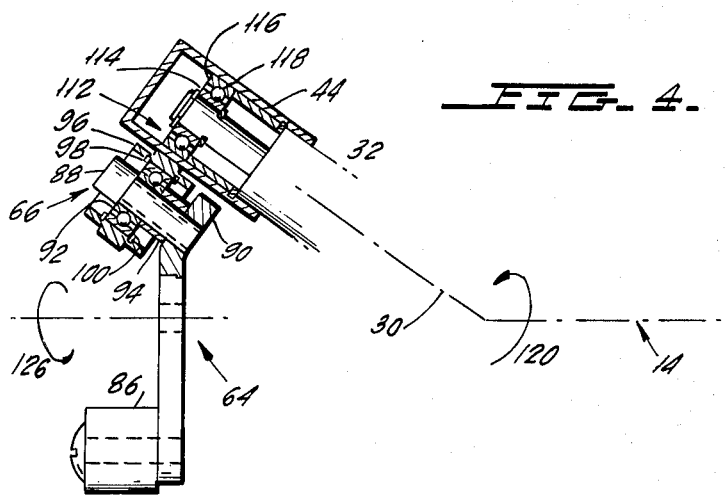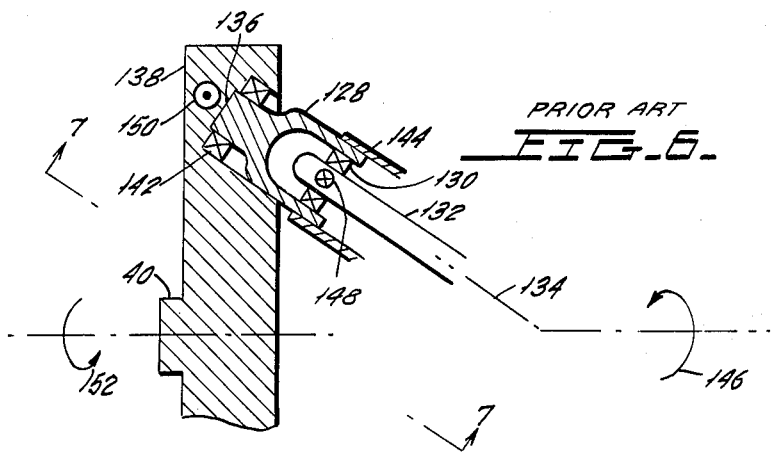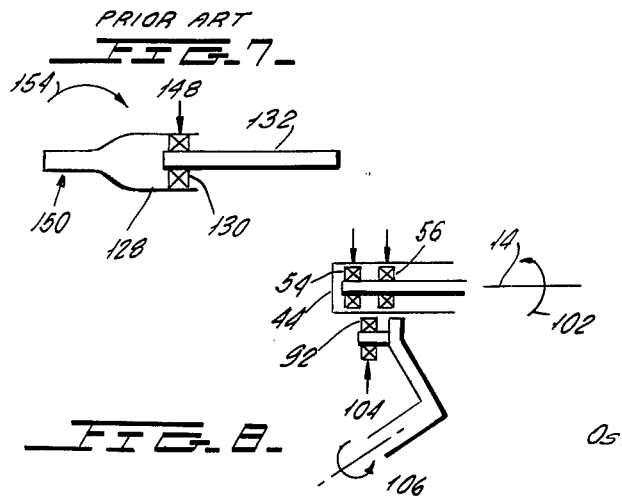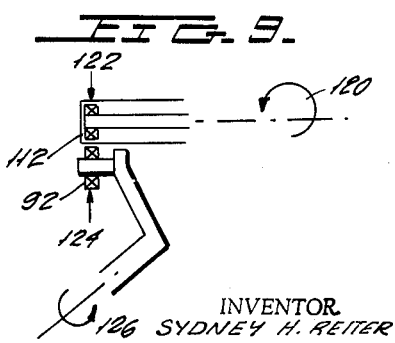

3,252,341
HIGH SPEED HERMETICALLY SEALED
SHAFT COUPLING
Sydney H. Reiter, 335 Longview Drive,
Mountainside, N.J.
Filed Dec. 9, 1964, Ser. No. 417,119
14 Claims. (Cl. 74—18.1)

This invention relates to shaft couplings. In particular this invention relates to hermetically sealed, shaft couplings capable of transmitting large torques from a driving shaft to a driven shaft at high speeds.

Attempts to transmit torque from an input shaft to an output through a hermetically sealed chamber have led to many difficulties.

In the past it has been suggested to provide a coupling by utilizing a stuffing box containing a packing material surrounding the input shaft. However, on continual rotation of the input shaft, the stuffing tends to wear away and must be continually replaced. Furthermore this type of stuffing box requires constant lubrication in order to minimize friction, and is not a truly hermetic seal.

Other prior art attempts to provide hermetically sealed shaft couplings have resulted in the use of highly polished plates rotating with an input shaft against the inner surfaces of an aperture through which the input shaft passes. This type of sealing means requires extremely high polished metal such as stainless steel and furthermore also requires constant lubrication while the input shaft is revolving. It is also not a truly hermetic seal.

Other previously proposed hermetically sealed shaft couplings utilize input shafts which are sealed from the output shaft driven thereby by cap members and suitable sealing elements in sealing relation therewith. The caps generally have extended portions which fit slots or apertures in an enlarged portion of the respective output shafts. Upon rotation of such an input shaft, torque is transmitted to the enlarged head of the output shaft and from there to the load mounted on the output shaft. Illustrations of this type of hermetically sealed shaft couplings may be found in U.S. Patent 2,607,233, issued to C. Bosch; U.S. Patent 3,029,648, issued to J. O. Roeser; and U.S. Patent 3,077,117, issued to R. Munro.

Several distinct problems have been encountered in attempting to use the last mentioned type of coupling particularly when it is desired to transmit high torque at high velocities. Where cap members mounted on the ends of the input shafts of such construction engage apertures defined by parts of the output shaft driven thereby (note the extended cap portion 18 of Bosch and the cap 36 of Roeser), the cap must be exactly aligned within the receiving slots therefor. Even with a slight degree of misalignment, there is an excessive amount of friction developed within such a coupling when high torque is attempted to be transmitted. Where ball bearings have been used to surround the extended cap portions, as in the Bosch and Roeser patents, the slightest misalignment of the caps within the head portions of the output shafts results in a cocking and burning out of the ball bearings.

Where the problem of misalignment has been recognized (see Munro U.S. Pat. 3,077,117), attempts to correct it have resulted in allowing a cap to freely ride in a slot of the output structure, with no bearing being present within the slot. However, at appreciable torques and speed, the friction produced by the metal-to-metal rubbing will soon cause the coupling to overheat. Such a device is inherently limited to low speeds and torques.

Additionally, as will be more specifically described hereinafter, such a coupling is subjected to a downward force on the angular inner portion of the input shaft and a corresponding upward force created by the load on the extended portion of the cap which is coupled to the output shaft. In the case of the Roeser device, these forces, when multiplied by their distances from the bearings 50 on the angular end of the input shaft, result in opposite torques tending to apply pressure to such bearings. In the Bosch and Munro patents the resistive load force on the extended portion of the cap when multiplied by its distance from the bearings 16 and 14 of Bosch and Munro respectively produce torques on such bearings. These torques are extremely large when it is desired to effect high power transmission and consequently cause the respective bearings to burn out early in the life of the shaft coupling.

It is therefore an object of the present invention to provide a hermetically sealed shaft coupling the bearing structure of which, although subjected to long periods of high speed, high torque, power transmission will not burn out or otherwise fail.

A further object of the instant invention is to provide such a hermetically sealed shaft coupling in which accurate tolerances need not be maintained between the driving and driven elements thereof.

Yet an additional object of the instant invention is to provide such a hermetically sealed shaft coupling which is relatively simple in design and yet which is readily maintained over long periods of operation without the need for constant replacement of packing, bearing elements, or the like.

Other objects will be apparent to one skilled in the art upon reading the following specification.

The instant invention is generally useful to transmit high power torque from one environment to a different environment. For example, the shaft coupling may be used to drive a mixing device in which case it might be desired to maintain the substance being mixed in a sealed container, or the shaft coupling may be used for transmitting rotary motion into a high vacuum test chamber. These are merely two illustrations of the many uses in which the shaft coupling of the instant invention may find application.

The hermetically sealed shaft coupling of this invention includes an enclosed chamber, into which an angled portion of a first rotatable shaft extends, the angled portion having a bearing or bearings mounted thereon. A cap is mounted on the angled portion with its inner surface engaging the bearing or bearings, the cap being secured to a flexible sealing sleeve enclosing the angled portion of the shaft and hermetically sealed to the chamber wall through which the shaft passes. A second rotatable shaft similarly extends into the chamber and has a crank member and bearing assembly mounted thereon. In accordance with the present invention, the bearing or bearings on the angled portion of the first shaft is so positioned as to be in alignment with the bearing assembly on the second shaft when the first shaft is rotated to cause the cap thereon to engage such bearing assembly, thereby effecting oscillation of the cap and rotation of the second shaft.

By mounting a separate bearing assembly on the second shaft and aligning such assembly with the bearing mechanism interposed between the sealing cap and the first rotatable shaft, the several disadvantages inherent in the prior art construction discussed hereinabove will be effectively overcome. It has been found that the shaft coupling hereof may be used to transmit high torques at high speeds from a driving shaft to a driven shaft, without failure for prolonged operating periods, a coupling embodying the present design having continuously transmitted ¾ horsepower at 1750 r.p.m. for 600 hours with no evidence of fatigue or wear. Since the cap member of the instant coupling construction does not engage within a slot or aperture of the output shaft, but instead bears against a bearing assembly mounted on such shaft when the first shaft is rotated into engagement therewith, critical tolerances need not be maintained and negligible friction is developed between the cap and the bearing assembly. Additionally since the bearing structure located on the angled portion of the first shaft is aligned with the bearing assembly of the output structure, no net torque is developed on the bearings between the respective shafts. By thus eliminating the disadvantages of the prior art, the shaft coupling of the instant invention is capable of transmitting high torques at high speeds for prolonged periods.

A fuller understanding of the invention may be had by referring to the following description of a preferred embodiment therefor, taken in conjunction with the accompanying drawings in which:

FIGURE 1 is a cross sectional view through a first preferred embodiment of the shaft coupling of the instant invention.

FIGURE 2 is a view taken along the arrows 2—2 of FIGURE 1, showing the physical relationship of the input shaft to the output structure.

FIGURE 3 is a partial cross section through the shaft coupling showing the relationship of the bearings of the input and output shaft.

FIGURE 4 is a partial cross section through a further embodiment of the invention which, like FIGURE 3, illustrates the relationship of the bearings of the input and output shaft.

FIGURE 5 is a view similar to FIGURE 1 which shows a modification of the shaft coupling.

FIGURE 6 is a partial schematic cross section through a typical hermetically sealed prior art shaft coupling.

FIGURE 7 is a schematic diagram showing the forces on the input and output shafts of the prior art structure of FIGURE 6, viewed in the direction of the arrows 7,7 of FIG. 6.

FIGURE 8 is a schematic diagram showing the forces which act on the input and output shafts of the coupling shown in FIGURES 1 and 3.

FIGURE 9 is a schematic diagram showing the forces which act on the input and output shafts of the coupling shown in FIGURE 4.

Referring to FIGURE 1 a preferred embodiment of the apparatus of the instant invention is seen to comprise a sealed enclosure generally indicated at 12, an input or driving shaft 14 located partially within the enclosure 12, and an output or driven shaft 16 also located partially within the enclosure 12.

The enclosure 12 is former by opposing end plates 18 and 20 and a cylindrical sleeve 22 interposed therebetween. Gaskets 24 provide an effective seal between end plates 18, 20, and the cylindrical sleeve 22. End plates 20 may have apertures 26, 28 extending therethrough. These apertures may communicate with the interior of a chamber on which the high speed shaft coupling may be mounted, thus providing a means for equalizing the pressure of the sealed chamber 12 and the interior of a chamber in which the shaft 16 may be mounted.

The input shaft 14 is seen to comprise an angled portion 30 which terminates in a neck portion 32. The angled portion of the input shaft extends through an aperture in end plate 18 into the enclosure 12. It is journaled for rotation in the enclosure by means of an input bushing 34 and bearing elements 36 and 38 mounted therein. The bearing elements are maintained within the bushing by means of a spacing sleeve 40 and snap ring 42.

A cap 44 is concentrically mounted upon the neck portion 32 of the input shaft 14. A resilient sleeve 46 constituted of rubber or other elastomeric material is hermetically selaed at one end thereof to the cap 44 by the clamping member 48 and at its other end to the end plate 18 by means of a plate 50 and fastening members 52. The cap and resilient sleeve thus hermetically seal the input shaft 14 from the output shaft 16 without interfering with power transmission therebetween.

Bearing elements 54 and 56 are located on the neck portion 32 of the input shaft, spaced apart by sleeve 58. The outer peripheries of the bearing elements 54 and 56 engage the inner surface of the cap 44 to provide a bearing between the input shaft and the sealing cap, thus preventing rotation of such shaft from producing excessive torsion on the resilient sleeve secured to the cap member.

The output shaft 16 includes a first portion 60 extending from the enclosure 12 and a second portion 62 extending within the enclosure 12. A generally Y-shaped crank member or spider 64 having extending arm portions 80, 82, 84 is secured to the inner portion 62 of the output shaft with roller assemblies 66 and 68 rotatably mounted on extending arm portions 80 and 84 respectively. A counter weight 86 is secured to arm portion 82.

The output shaft 16 extends through an aperture in end plate 20 into the enclosure 12. The shaft is journaled for rotation by means of an output bushing 70 and bearing elements 72 and 74 mounted therein. The bearing elements 72, 74 are maintained within the bushing by means of a sleeve 76 and snap rings 78.

Each of the roller assemblies comprises an axle member 88 which preferably is a screw threadably engaging an angular extension 90 of the spider arm (see FIGURE 3). A bearing element 92 is located on the axle 88, spaced from the extension 90 by a spacer 94. A nylon tire 96 is mounted on the outer periphery of the bearing element 92, secured thereto by snap rings 98, 100.

Upon rotation of the input shaft 14 in a counterclockwise direction, as seen in FIGURE 2, the cap 44 is brought to bear against the roller assembly 68 to impart counterclockwise rotation to the crank member 64 and output shaft 16. Upon rotation of the input shaft 14 in a clockwise direction, as seen in FIGURE 2, the cap 44 is brought to bear against the roller assembly 66, clockwise rotation of the output shaft 16 being thus produced. In either case, the output shaft 16, spider 64, and spider arm extensions 90, are so positioned that when the input shaft 14 rotates the cap 44 into engagement with either of the roller assemblies, the bearing element 92 is in alignment with the bearing defined by elements 54 and 56, and equispaced therebetween.

As noted above and as can be seen in FIGURE 3, when the cap 44 bears against the roller assembly 66, the bearing element 92 is opposite from and equispaced between the bearing elements 54 and 56 which are mounted on the neck portion 32 of the input shaft. As shown in FIGURE 8 when a driving torque 102 is applied to the input shaft 14 an upward resistive force 104 (resulting from a resistive load torque 106) is produced, directly opposed by downward vertical forces 108 and 110 each of which carry one half of the force 104. With an arrangement, it is therefore possible to transmit extremely high torques at high speeds for long periods of time.

With reference to the modification shown in FIGURE 4, the bearing element 92 of the roller assembly 66 is so disposed as to be aligned with a single bearing element 112 mounted on neck portion 32 of the input shaft 14 when the cap 44 is brought to bear against the roller assembly 66 in response to rotation of the input shaft 14. The coupling of FIGURE 4 is otherwise the same as the coupling of FIGURE 1.

FIGURE 4 also shows a detailed sectional view of the bearing element 112. It is to be noted that all the bearing elements of the instant invention may be of the same construction. The bearing element is a ball bearing structure which comprises an inner member 114 secured to the neck portion 32 of the input shaft and an outer member 116 secured to the inner surface of the cap 44. The inner member 114 and outer member 116 have aligned raceways in which are mounted ball bearings 118. The ball bearings 118 are conventional steel ball bearings and permit virtually frictionless rotation of the neck portion 32 within the cap 44.

From the standpoint of ease of construction, the modification of FIGURE 3 is preferred over the structure of FIGURE 4, since it is easier to equispace two bearing elements (52, 54) one on each side of the bearing element 92 than to locate one bearing element (112) exactly opposite bearing element 92. Also the use of the two bearing elements allows lighter and less expensive bearings.

When the drive torque 120 is applied to the input shaft 14 (see FIGURE 9) the downward vertical component of force 122 produced thereby is directly opposed by a resistive force 124 created by the resistive effect of the load torque 126. Once again there are opposing forces acting on the bearing elements 92 and 112, but no torques are produced on these elements.

The advantages resulting from so disposing the bearing element 92 with respect to the bearing elements 54 and 56 of FIGURES 1 and 3, and bearing element 112 of FIGURE 4 will now be explained with reference to FIGURES 6, 7 and 8.

FIGURE 6 is a partial cross section of a hermetically sealed shaft coupling illustrative of the prior art and corresponds generally to the construction of the coupling illustrated in FIGURE 1 of the patent to J. O. Roeser, Patent No. 3,029,648, issued April 17, 1962.

As shown in FIGURE 6, a cap 128 is mounted upon a bearing 130 which bearing is in turn located on angled end portion 132 of the input shaft 134. The end of the cap 128 is journaled within a slot 136 of an enlarged portion 138 of the output shaft 140. A bearing structure 142 is interposed between the slot 136 and the end of the cap 128 to reduce friction. A flexible sealing sleeve 144 is hermetically sealed at one end to the cap and at the other end to a wall of an enclosure (now shown). Upon application of a driving torque, shown by the arrow 146, to the input shaft 134 there will be a downward force 148 applied to the end of angled portion 132. Opposing this downward force 148 will be an equal and opposite force 150 caused by the resistive load torque 152 on the output shaft 140. The resistive force 150 creates a clockwise torque 154 (FIGURE 7) about the bearing 130 and consequently results in tremendous pressure being brought upon that bearing. In other words, the bearing 130 shown in FIGURES 6 and 7 acts as a fulcrum and must be capable of withstanding downward force 148 and in addition the clockwise torque 154 created by the resistive force 150 multiplied by its distance from the ball bearing 130.

Even where additional bearings (such as at 50 and 14 of Roeser, U.S. Patent 3,029,648 and Munro, U.S. Patent 3,077,117 respectively) have been provided on the input shaft in an attempt to counteract torque 154, the resulting structure has the effect of doubling the downward force 148 on bearing 130, since that force must now be equal in magnitude to force 150 plus the upward force (which force gives the desired counteracting torque) on the additional bearing.

In attempting to utilize prior art shaft couplings for high power torque transmission, it has been discovered that this fulcrum-like structure of the prior art results in a quick burning out of the interior bearing structure and consequently prevents use of the shaft coupling for the full period of its intended life.

FIGURE 5 is a modification of the coupling hereof in which is shown how the shaft coupling may be modified in order to function when a high vacuum or high pressure is introduced within the enclosure 12. With a high pressure or vacuum within enclosure 12, the interior of the resilient sleeve 46 must be maintained at the same pressure to avoid collapse or explosion thereof. To accomplish this, input bushing 34 is provided with an aperture 156 therethrough and suitable passageways (not shown) are provided through the bearing element 38 to communicate with the interior of the resilient sleeve 46. A conventional shaft seal is secured to the outer end of the input bushing 34 and comprises a collar member 158 with suitable stuffing 160 located between the shaft 14 and the collar member 158. When high pressures are introduced through the aperture 156 there will be some leakage through the stuffing 160 and collar 158. However, as long as the flow being introduced is greater than this leakage, then the interior of the resilient sleeve 46 will be maintained under pressure. In the case of an extremely high vacuum within the enclosure 12, the inherent disadvantages of the collar element 158 and stuffing element 160 will not allow the vacuum within the sleeve 46 to be as good as the vacuum which may be within the enclosure 12. However, the difference between a vacuum of $10^{-8}$ millimeters of mercury within the enclosure 12, for example, and $10^{-3}$ millimeters of mercury within the sleeve 46, for example, would result in very little force being applied to the resilient sleeve 46. Thus the instant invention may be easily and cheaply modified to function in an environment where the enclosure 12 is in communication with a high vacuum or high pressure container.

As was mentioned above, prior art hermetically sealed shaft couplings require that the cap portion mounted on the input shaft (or an extension thereof) be inserted in a slot or aperture of part of the output structure. It will be obvious upon inspection of such prior art devices that misalignment will result in excessive friction being developed at that connection. If ball bearings are used between the cap (or an extended portion thereof) and the slot or aperture of this output structure, then misalignment will result in a cocking and wearing out of the ball bearings so positioned. It is to be noted that the instant invention eliminates any problems of alignment of the cap 44 within a slot or aperture. As can be seen in all of the figures, and in particular FIGURE 2, the cap 44 is not engaged with any member of the output shaft structure. On the contrary, it bears against the roller assemblies 66 or 68 (depending on the direction of rotation of the input shaft) and consequently does not suffer from the disadvantages enumerated above. Since roller assemblies 66 and 68 are free to rotate upon the screw 88 and 90, there is, relatively speaking, no friction developed between the cap 44 and the roller assemblies when the input shaft is rotated.

Thus there is provided a novel high power hermetically sealed shaft coupling which does not require any part of the input shaft to reside within or connect to any part of the output shaft. Furthermore, there is provided a novel high power hermetically sealed shaft coupling in which there is no net torque developed on the bearing element (or elements) which is located on the end of the input shaft and within the cap mounted thereon. Instead that bearing element (or elements) is located in direct opposition to a bearing element located within the roller assembly against which the cap bears when the input shaft is rotated. This novel loading of the bearing element allows the shaft coupling of the instant invention to transmit high torques at high speeds for long periods of time.

Although I have described my invention with a certain degree of particularity, it is understood that the present disclosure has been made only by example and that numerous changes in the details of construction may be resorted to without departing from the sphere and scope of the invention. For example, more than two bearing elements could be mounted on the neck portion of the input shaft thus reducing the size and cost of those bearing elements. However, when a plurality of bearing elements are so used, they must always be so arranged as to result in no net torque being applied to the bearing located within the roller assemblies. As another example of a change contemplated within the scope of this invention, the functions of the input and output shafts may be completely reversed, that is, the output shaft 16 may become the driving shaft and the input shaft 14 the driven shaft.

What is intended to be protected by Letters Patent is hereinafter claimed.

The embodiments of the invention in which an exclusive privilege or property is claimed are defined as follows:

1. A hermetically sealed shaft coupling comprising:
   (a) an enclosed chamber;
   (b) a first rotatable shaft journaled in a first wall of said chamber, said shaft having an angled portion thereof extending into said chamber;
   (c) a first bearing means mounted on said angled portion of said first shaft;
   (d) a cap mounted on the end of said angled portion of said first shaft, the inner surface of said cap engaging said first bearing means;
   (e) a flexible sealing means enclosing said angled portion of said first shaft, one end of said flexible sealing means being hermetically sealed to said first wall of said chamber, the other end thereof being hermetically sealed to said cap;
   (f) a second rotatable shaft journaled in a second wall of said chamber, said second shaft being coaxial with said first shaft, said second shaft having a first portion thereof extending into said chamber;
   (g) a crank member fixedly secured to said first portion of said second shaft;
   (h) and a second bearing means mounted on said crank member;
      said first bearing means being positioned on the angled portion of said first shaft in alignment with said second bearing means when the first shaft is rotated, with said cap bearing against the second bearing means, thereby effecting oscillation of the cap and rotation of the second shaft.

2. The hermetically sealed shaft coupling of claim 1, wherein said second bearing means comprises:
   a roller assembly mounted on said crank member, said roller asembly including:
      (i) an axle element secured to said crank member,
      (ii) a bearing element rotatably mounted on said axle element,
      (iii) and a bearing surface encompassing the periphery of said bearing element,
         said first bearing means being positioned on the angled portion of said first shaft in alignment with the bearing element of the roller assembly when said first shaft is rotated to cause said cap to bear against the bearing surface of the roller assembly, thereby effecting oscillation of the cap and rotation of the second shaft.

3. A hermetically sealed shaft coupling comprising:
   (a) an enclosed chamber;
   (b) a first rotatable shaft journaled in a first wall of said chamber, said shaft having an angled portion thereof extending into said chamber;
   (c) a first bearing means mounted on said angled portion of said first shaft;
   (d) a cap mounted on the end of said angled portion of said first shaft, the inner surface of said cap engaging said first bearing means;
   (e) a flexible sealing means enclosing said angled portion of said first shaft, one end of said flexible sealing means being hermetically sealed to said first wall of said chamber, the other end thereof being hermetically sealed to said cap;
   (f) a second rotatable shaft journaled in a second wall of said chamber, said second shaft being coaxial with said first shaft, said second shaft having a first portion thereof extending into said chamber;
   (g) a spider member fixedly secured to said first portion of said second shaft, said spider member having first and second extending arm portions;
   (h) and second and third bearing means rotatably mounted on said first and second extending arm portions, respectively;
      said first bearing means being positioned on the angled portion of the first shaft in alignment with said second bearing means when the first shaft is rotated in a first direction to cause said cap to bear against said second bearing means, thereby effecting oscillation of said cap and rotation of said second shaft in said first direction, and in alignment with said third bearing means when said first shaft is rotated in the opposite direction to cause said cap to bear against said third bearing means, thereby effecting oscillation of said cap and rotation of said second shaft in the opposite direction.

4. The hermetically sealed shaft coupling of claim 3 wherein said second and third bearing means comprise:
   first and second roller assemblies mounted on said first and second extending arm portions respectively, each roller assembly including,
      (i) an axle element secured to one of said extending arm portions,
      (ii) a bearing element rotatably mounted on said axle element, and
      (iii) a bearing surface encompassing the periphery of said bearing element;
         said first bearing means being positioned on said angled portion of said first shaft in alignment with said bearing element of said first roller assembly when said first shaft is rotated in a first direction to cause said cap to bear against the bearing surface of said first roller assembly, thereby effecting oscillation of said cap and rotation of said second shaft in said first direction; and in alignment with the bearing element of said second roller assembly when said first shaft is rotated in the opposite direction to cause said cap to bear against the bearing surface of said second roller assembly, thereby effecting rotation of said second shaft in the opposite direction.

5. The apparatus of claim 4, wherein said first bearing means and the bearing elements of said first and second roller assemblies are ball bearings.

6. The apparatus of claim 4, wherein the bearing surfaces of the first and second roller assemblies are nylon tires.

7. A hermetically sealed shaft coupling comprising:
   (a) an enclosed chamber;
   (b) a first rotatable shaft journaled in a first wall of said chamber, said shaft having an angled portion thereof extending into said chamber;
   (c) first and second bearing elements mounted on the angled portion of said first shaft;
   (d) a cap mounted on the end of the angled portion of said first shaft, the inner surface of said cap engaging said first and second bearing elements;
   (e) a flexible sealing means enclosing said angled portions of said first shaft, one end of said flexible sealing means being hermetically sealed to said first wall of said chamber, the other end thereof being hermetically sealed to said cap;
   (f) a second rotatable shaft journaled in a second wall of said chamber, said second shaft being coaxial with said first shaft, said second shaft having a first portion thereof extending into said chamber;
   (g) a crank member fixedly secured to said first portion of said second shaft;
   (h) and a bearing means rotatably mounted on said crank member;
      said first and second bearing elements being positioned on said angled portion of said first shaft equispaced from said bearing means when said first shaft is rotated to cause said cap to bear against said bearing means, thereby effecting oscillation of said cap and rotation of said second shaft.

8. The hermetically sealed shaft coupling of claim 7 wherein said bearing means comprises:
 (i) an axle element secured to said crank member,
 (ii) a bearing element rotatably mounted on said axle element,
 (iii) and a bearing surface encompassing the periphery of said bearing element,
   said first and second bearing elements being positioned on the angled portion of said first shaft equispaced from the bearing element of the roller assembly when said first shaft is rotated to cause said cap to bear against the bearing surface of the roller assembly, thereby effecting oscillation of the cap and rotation of said second shaft.

9. The apparatus of claim 8 wherein said first and second bearing elements are spaced from each other on said angled portion by a distance equal to the thickness of the bearing element of said roller assembly.

10. A hermetically sealed shaft coupling comprising:
 (a) an enclosed chamber;
 (b) a first rotatable shaft journaled in a first wall of said chamber, said shaft having an angled portion thereof extending into said chamber;
 (c) first and second bearing elements mounted on said angled portion of said first shaft;
 (d) a cap mounted on the end of the angled portion of said first shaft, the inner surface of said cap engaging said first and second bearing elements;
 (e) a flexible sealing means enclosing said angled portion of said first shaft one end of said flexible sealing means being hermetically sealed to said first wall of said chamber the other end thereof being hermetically sealed to said cap;
 (f) a second rotatable shaft journaled in a second wall of said chamber, said second shaft being coaxial with said first shaft, said second shaft having a first portion thereof extending into said chamber;
 (g) a spider member fixedly secured to said first portion of said second shaft, said spider member having first and second extending arm portions;
 (h) and first and second bearing means rotatably mounted on said first and second extending arm portions respectively;
   said first and second bearing elements being positioned on the angled portion of said first shaft equispaced from the first bearing means when said first shaft is rotated in a first direction to cause said cap to bear against said first bearing means, thereby effecting oscillation of the cap and rotation of said second shaft in said first direction; and equispaced from said second bearing means when said first shaft is rotated in the opposite direction to cause the cap to bear against said second bearing means, thereby effecting oscillation of the cap and rotation of the second shaft in the opposite direction.

11. The hermetically sealed shaft coupling of claim 10; wherein said first and second bearing means comprise: first and second roller assemblies mounted on said first and second extending arm portions respectively, each roller assembly comprising,
 (i) an axle element secured to one of said extend- arm portions,
 (ii) a bearing element rotatably mounted on said axle element, and
 (iii) a bearing surface encompassing the periphery of said bearing element;
   said first and second bearing elements being positioned on the angled portion of said first shaft equispaced from the bearing element of said first roller assembly when said first shaft is rotated in a first direction to cause said cap to bear against the bearing surface of the first roller assembly, thereby effecting oscillation of said cap and rotation of said second shaft in said first direction; and equispaced from the bearing element of the second roller assembly when first shaft is rotated in the opposite direction to cause said cap to bear against the bearing surface of said second roller assembly, thereby effecting oscillation of said cap and rotation of said second shaft in the opposite direction.

12. The apparatus of claim 11, wherein said first and second bearing elements are spaced from each other on said angled portion by a distance equal to the thickness of the bearing elements of said first and second roller assemblies.

13. The apparatus of claim 11, wherein said first and second bearing elements, and the bearing elements of said first and second roller assemblies are ball bearings.

14. The apparatus of claim 11, wherein the bearing surfaces of said first and second roller assemblies are nylon tires.

References Cited by the Examiner
UNITED STATES PATENTS
2,610,525  9/1952  Sprigg _____ 74—17.8

MILTON KAUFMAN, *Primary Examiner.*